(12) United States Patent
Messenger et al.

(10) Patent No.: US 11,940,119 B2
(45) Date of Patent: Mar. 26, 2024

(54) LOGO LAMP DEVICE, REAR VIEW SYSTEM, VEHICLE AND METHOD FOR ASSEMBLING

(71) Applicant: MOTHERSON INNOVATIONS COMPANY LIMITED, London (GB)

(72) Inventors: Jacob Heath Messenger, Lonsdale (AU); Dean Stevens, Lonsdale (AU)

(73) Assignee: Motherson Innovations Company Limited, London (GB)

(*) Notice: Subject to any disclaimer, the term of this patent is extended or adjusted under 35 U.S.C. 154(b) by 0 days.

(21) Appl. No.: 18/187,044

(22) Filed: Mar. 21, 2023

(65) Prior Publication Data
US 2023/0313966 A1  Oct. 5, 2023

(30) Foreign Application Priority Data
Mar. 31, 2022 (EP) .................................... 22166123

(51) Int. Cl.
*B60Q 1/26* (2006.01)
*F21S 43/14* (2018.01)
*F21S 43/20* (2018.01)
*F21S 43/50* (2018.01)

(52) U.S. Cl.
CPC ............ *F21S 43/50* (2018.01); *B60Q 1/2665* (2013.01); *F21S 43/14* (2018.01); *F21S 43/26* (2018.01)

(58) Field of Classification Search
CPC .............................. F21S 43/50; B60Q 1/2665
See application file for complete search history.

(56) References Cited

U.S. PATENT DOCUMENTS

| 11,618,371 B1* | 4/2023 | Kim ..................... F21S 41/285 |
| | | 362/520 |
| 2017/0368985 A1* | 12/2017 | Yokoyama ............ F21S 41/141 |
| 2017/0371235 A1* | 12/2017 | Yokoyama .............. F21S 43/26 |

(Continued)

FOREIGN PATENT DOCUMENTS

| CN | 103591522 | 2/2014 |
| CN | 206191514 | 5/2017 |

(Continued)

OTHER PUBLICATIONS

European Patent Office, Appl. 22166123.4, Extended European Search Report, dated Oct. 4, 2022.

*Primary Examiner* — Eric T Eide
(74) *Attorney, Agent, or Firm* — Jones Day

(57) ABSTRACT

The present disclosure relates to a logo lamp device for a vehicle which may include an inner housing and an outer housing, the inner housing and the outer housing having an open end; an encapsulant configured opposite to the open end of the inner housing and the outer housing; a printed circuit board (PCB) enclosed within the inner housing; at least one light source connected to the PCB and enclosed within the inner housing; and an optical assembly having plurality of lenses, wherein the plurality of lenses comprises at least one first lens and at least one second lens. The logo lamp device may include at least one retaining mechanism configured between the at least one first lens and the inner housing, wherein the at least one first lens is configured to push the at least one second lens against the inner housing, and/or the at least one first lens is detachably mounted onto the inner housing.

12 Claims, 7 Drawing Sheets

(56) References Cited

U.S. PATENT DOCUMENTS

2019/0270403 A1\* 9/2019 Sobecki .................. F21S 43/51
2020/0166191 A1 5/2020 Kim et al.
2020/0198530 A1\* 6/2020 Hellin_Navarro ... B60Q 1/2696
2020/0290516 A1\* 9/2020 Messenger ................ B60R 1/06

FOREIGN PATENT DOCUMENTS

| CN | 209279074  | 8/2019 |
| CN | 2010291721 | 4/2020 |
| KR | 101882907  | 7/2018 |
| KR | 102278382  | 7/2021 |

\* cited by examiner

LOGO LAMP DEVICE, REAR VIEW SYSTEM, VEHICLE AND METHOD FOR ASSEMBLING

CROSS-REFERENCE TO RELATED APPLICATION

This application claims priority to European Patent Application No. EP 22 166 123.4, filed on Mar. 31, 2022, which is incorporated by reference herein in its entirety.

FIELD

The present disclosure relates to a logo lamp device, in particular for a vehicle, which may include an inner housing and an outer housing, the inner housing and the outer housing having an open end; an encapsulant configured opposite to the open end of both the inner housing and the outer housing; a printed circuit board (PCB) enclosed within the inner housing; at least one light source connected to the PCB and enclosed within the inner housing; and an optical assembly having plurality of lenses, wherein the plurality of lenses comprises at least one first lens and at least one second lens. Such a logo lamp device may be suited for projecting a light or a pattern of light adjacent to a vehicle. The disclosure further relates to a vehicle with at least one such a logo lamp device and a method of assembling such a logo lamp device.

BACKGROUND

Typical logo lights, also referred to as approach lights or security lights, have been used as a way to improve security around a vehicle and/or to project an aesthetically pleasing logo adjacent to the vehicle.

Modern vehicles include functional elements and/or decorative elements, such as security lights, approach lights, integrated in the vehicles. Security lights or approach lights are typically used as a way to improve security around the vehicle. More recently more sophisticated projector-based lamps have been developed that use a lens arrangement incorporating a filter, mask, or screen (or similar) to project a logo, image symbol, text, icon, or the like (referred to as logo in the following) through an aperture. Projection of the logo requires the use of more complicated optical arrangements compared with standard approach lights. Projection based lights will be referred to as logo lamp in the following. In order to make sure that the logo can be projected onto a road without any distortions, the position of the logo lamp must be exactly defined. Typically, logo lamps are integrated within rear view system of the vehicle. However, the logo lamps may be mounted directly on the vehicle independent of the rear view systems.

Logo lamps usually include a housing, a light source mounted on a printed circuit board and a lens or a plurality of lenses that are placed on top of each other. On exposure to shock or vibration the lenses produce rattling noise and may get damaged on prolonged exposure. This may also cause the lenses to get misaligned and hence projection of the logo gets distorted. When the lenses are manually assembled, friction fits can be used to prevent rattling of the lenses when they are exposed to shock or vibration. However, manual assembly is time consuming and is not cost effective. In the case of automated assembly, it is preferred to have clearance between lenses to prevent jamming and allow the fastest possible assembly time. Furthermore, an extra component (e.g. cover) or glue, screw or welding process is generally required to hold the lenses and the PCB to the housing making the stack of lens rigid, and thus would cause either a rattle or significant strain on the PCB on exposure to shock or vibration.

EP 3 470 270 B1 discloses a logo lamp comprising a housing having a top, a bottom, a left side, a right side, a front, and a back, a cap covering the top of the housing or preferably an encapsulant, one or more clips formed integrally with or attached to the housing, a connector receiving portion including an opening formed at the back of the housing, a printed circuit board (PCB) fully enclosed within the housing, a light source connected to the PCB and enclosed within the housing, and an optical assembly including at least one optical element for receiving light projected by the light source. However, EP 3 470 270 B1 does not discloses any means for preventing rattling of the lenses.

U.S. Pat. No. 11,162,656 B2 discloses a puddle lamp, and CN 207880742 U discloses a greeting lamp. Both U.S. Pat. No. 11,162,656 B2 and CN 207880742 U disclose one or more lenses, however, none of them discloses any means for preventing rattling of the lenses.

Thus, all of the above prior arts may have a drawback of having a rattling sound of the lenses on exposure to shock and vibration.

It is an object of the present disclosure to further develop the known logo lamp device to overcome the drawbacks of the prior art.

SUMMARY

An example logo lamp device according to the present disclosure comprises at least one retaining mechanism configured between the at least one first lens and the inner housing, wherein the at least one first lens is configured to push the at least one second lens against the inner housing, and/or the at least one first lens is detachably mounted onto the inner housing.

The logo lamp device according to embodiments of the present disclosure has an advantage that a retaining mechanism is configured in the logo lamp device such that the at least one first lens is detachably mounted onto the inner housing, and/or the at least one first lens always pushes other parts of the optical assembly against the housing such that there is always a residual force acting between the optical assembly and the inner housing. The residual force keeps the optical assembly intact and thus any rattling noise is prevented on exposure to shock or vibration. Since there is no rattling in the optical assembly, the plurality of lenses is protected from getting damaged on exposure to shock or vibration, thus the operating life of the logo lamp device is enhanced. Further, since the optical assembly is kept intact, the plurality of lenses is also prevented from any misalignment due to exposure to shock or vibration.

The logo lamp device according to embodiments of the present disclosure may be mounted within a rear view system. However, various embodiments are possible in which the logo lamp device may be mounted separately on the vehicle. In other possible embodiments, the logo lamp device may be used in non-vehicular systems as well.

The term "vehicle" denotes any motor driven vehicle with or without trailers driven be a driver, where the driver requires information about persons, other vehicles or objects in the (near) surrounding of the vehicle to be able to drive safety. As an example, vehicles are cars, trucks, tractors or trailers.

The term "rear view" is herein referred as a view of the surrounding area, which is not in the field of view of a driver, i.e. the directions opposing, left, right, below and above of the viewing direction, but can also comprise the view in the direction of the viewing direction of the driver and/or any combinations of the directions.

The term "driver" and "driver of the vehicle" relates here to the person controlling the main parameters of the vehicle, such as for example direction, speed and/or altitude, e.g. normally the person located in the location specified for the controlling person, for example a seat, but can also relate to any other person or entity within or outside of the vehicle.

The term "lens" denotes an optical body that features a single lens or a plurality of lenses that mounts to the logo lamp device. Some lenses are interchangeable, while others are built into the construction of the logo lamp body. The lens is responsible for condensing and projecting light rays from the light source to the surrounding the vehicle.

In an embodiment, the retaining mechanism comprises a snap fit mechanism, wherein the at least one first lens comprises at least one extended arm having a retaining end, and the inner housing comprises a receiving portion for receiving the retaining end of the at least one extended arm of the at least one first lens. The snap fit mechanism comprises a small protrusion (hook, stud, or bead) which is deflected during assembly to catch in a depression on the mating part. In this embodiment, the at least one first lens has an extended arm with a retaining end. The extended arm of the at least one first lens is in the form of U-shape or V-shape which is configured to be deflected when assembly is initiated. The inner housing has a receiving portion, which is configured to receive the retaining end of the at least one first lens. When assembled, the retaining end of the at least one first lens sits on the receiving portion of the inner housing and the extended arm regains original shape, hence the at least one first lens is locked on the housing. This configuration has an advantage that by using simple snap fit mechanism, the optical assembly is retained within the inner housing without any rattling in case of shock and vibration. The design and manufacturing of snap fit mechanism is simple. Further, the snap fit mechanism is a detachable mechanism and hence replacement of parts is possible.

In another embodiment, the retaining mechanism comprises a threaded mechanism, wherein the at least one first lens comprises at least one extended arm having threads, and the inner housing comprises threads complementary to the threads of the at least one first lens. During assembly, the threads of the at least one first lens mate with the threads of the inner housing. This configuration has an advantage that by using simple threaded mechanism, the optical assembly is retained within the inner housing without any rattling in case of shock and vibration. The design and manufacturing of threaded mechanism is simple. Further, the threaded mechanism is a detachable mechanism and hence replacement of parts is possible.

In another embodiment, the retaining mechanism comprises a bayonet mechanism, wherein the at least one first lens comprises at least one extended arm having bayonet end, and the inner housing comprises bayonet receiving portion. During assembly, the bayonet end of the at least one first lens mate with the bayonet receiving portion of the inner housing. This configuration has an advantage that by using simple bayonet mechanism, the optical assembly is retained within the inner housing without any rattling in case of shock and vibration. The design and manufacturing of bayonet mechanism is simple. Further, the bayonet mechanism is a detachable mechanism and hence replacement of parts is possible.

In an embodiment, the at least one first lens is a condenser lens and at least one second lens is a projector lens. The advantage of using at least one condenser lens and at least one projector lens is that the projection of light is directed uniformly and thus enhancing the logo projection.

In an embodiment, the at least one first lens comprises one first lens and the at least one second lens comprises a plurality of second lenses.

In an embodiment, the optical assembly further comprises a mask interposed between the at least one first lens and the at least one second lens. The advantage of using the mask is that any image, shape, letter, symbol, icon or logo can be projected. Various color combination of the projection is also possible. With the arrangement of the retaining mechanism between the at least one first lens and the inner housing, the mask is also retained and held in position due the residual force acting between the optical assembly and the inner housing by the retaining mechanism. Further, the mask may be provided with at least one cut-out for determining a projection, which may be in form of an image, shape, letter, symbol, icon or logo or a combination thereof.

In an embodiment, the inner housing and the outer housing are made in one piece, that is to say, the inner housing and the outer housing are molded together as a single unit. The advantage of having one-piece inner housing and outer housing is that the manufacturing cost of the housing is reduced.

In an embodiment, the inner housing and the outer housing are made in separate piece, that is to say, the inner housing and the outer housing are molded separately and joined together by a joining element, such as a mechanical fastener, adhesive or welding. The advantage of having multi-piece inner housing and outer housing is that the modularity of the housing is enhanced.

In an embodiment, the outer has a cylindrical portion, at least one arm, at least one wing and at least one hole for positioning and fixing the logo lamp device on the rear view system.

Embodiments of the present disclosure also provide a rear view system of a vehicle as well as a vehicle comprising at least one logo lamp device according to the present disclosure.

In an embodiment of the vehicle, the one or more logo lamp device is mounted on the vehicle at a mounting location selected from a group at the front portion, at the rear portion, on a side portion, on front bumper, on the rear bumper, on a left door and on a right door of the vehicle. Thus, various location around the vehicle can be projected in various combination of shape and size of the logos.

Embodiments of the present disclosure also provide a method for assembling a logo lamp device according to the present disclosure. The method comprises:
  providing an inner housing, an outer housing and an optical assembly having a plurality of lenses and a mask, wherein the inner housing is enclosed within the outer housing, and wherein the plurality of lenses comprises at least one first lens and at least one second lens;
  arranging at least one second lens of the optical assembly within the inner housing;
  arranging the mask on top of the at least one second lens;
  bringing the at least one first lens with an assembling tool, wherein the at least one first lens axially faces the mask and is axially aligned with the at least one second lens;
  fixing the at least one first lens on the inner housing by using the assembling tool to obtain a closed-fit arrangement of the at least one first lens, the mask and the at least one second lens, wherein the at least one first lens, the mask and the at least one second lens are arranged on a common axis;

arranging a printed circuit board (PCB) on top of the at least one first lens, wherein the PCB has at least one light source facing the at least one first lens; and disposing an encapsulant over the PCB, the inner housing and the outer housing to obtain the logo lamp device.

The method according to embodiments of the present disclosure has the advantage that by using simple assembling tool the at least one first lens is mounted on the inner housing such that no rattling noise is present on exposure to shock and vibration.

In an embodiment, the at least one first lens is provided with a protrusion for detachably attaching the assembling tool. Thus, the assembling tool can be detached easily when assembly is completed.

Other aspects, advantages, and salient features of the present disclosure will become apparent to those skilled in the art from the following detailed description, which taken in conjunction with the annexed figures, discloses exemplary embodiments of the disclosure.

DETAILED DESCRIPTION

It is to be understood that the embodiments described are merely exemplary of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1A:
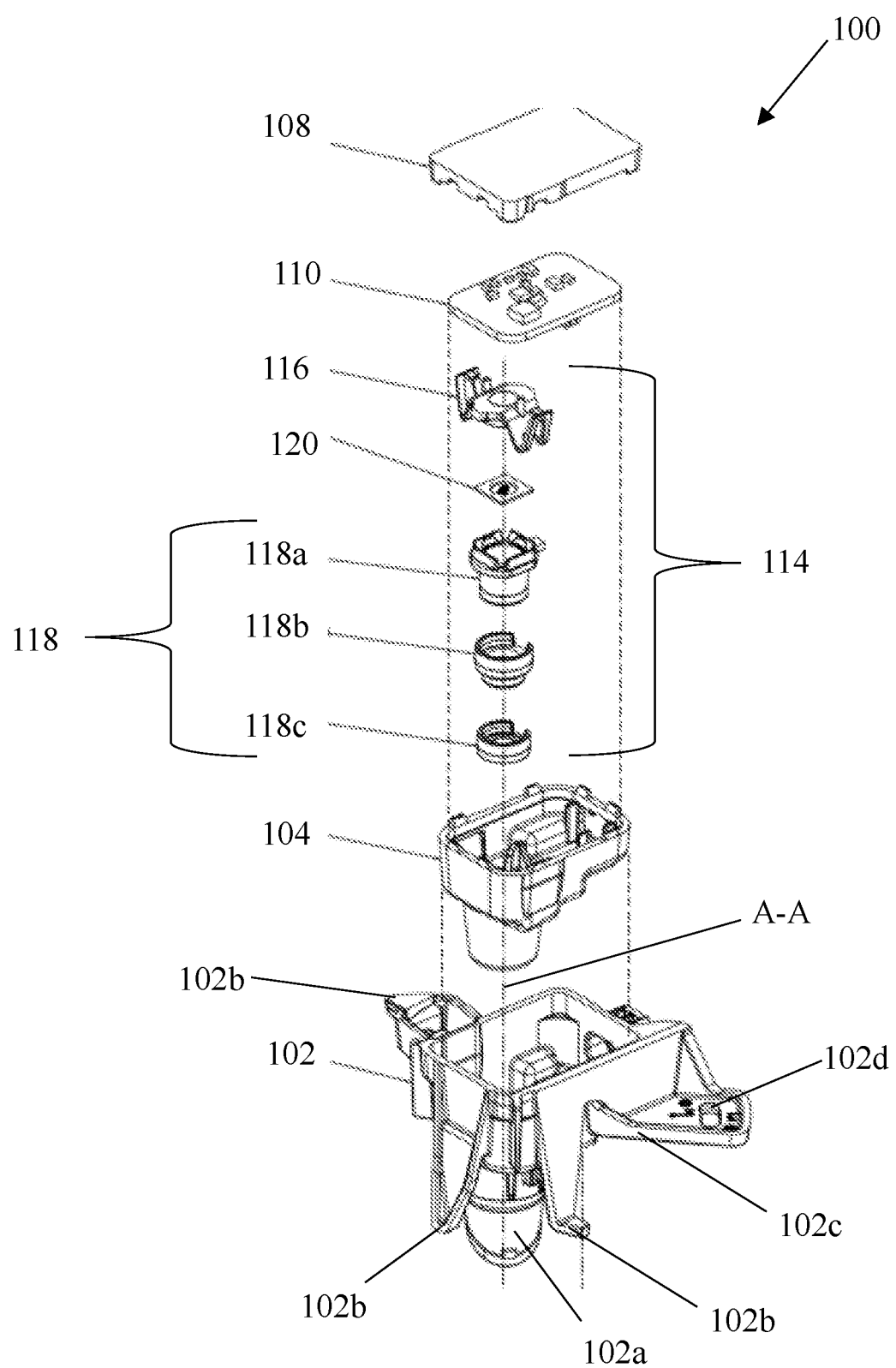
FIGS. 1a and 1b: illustrate an exploded view and a sectional view of a logo lamp device according to a first embodiment of the present disclosure.
Figure 1B:
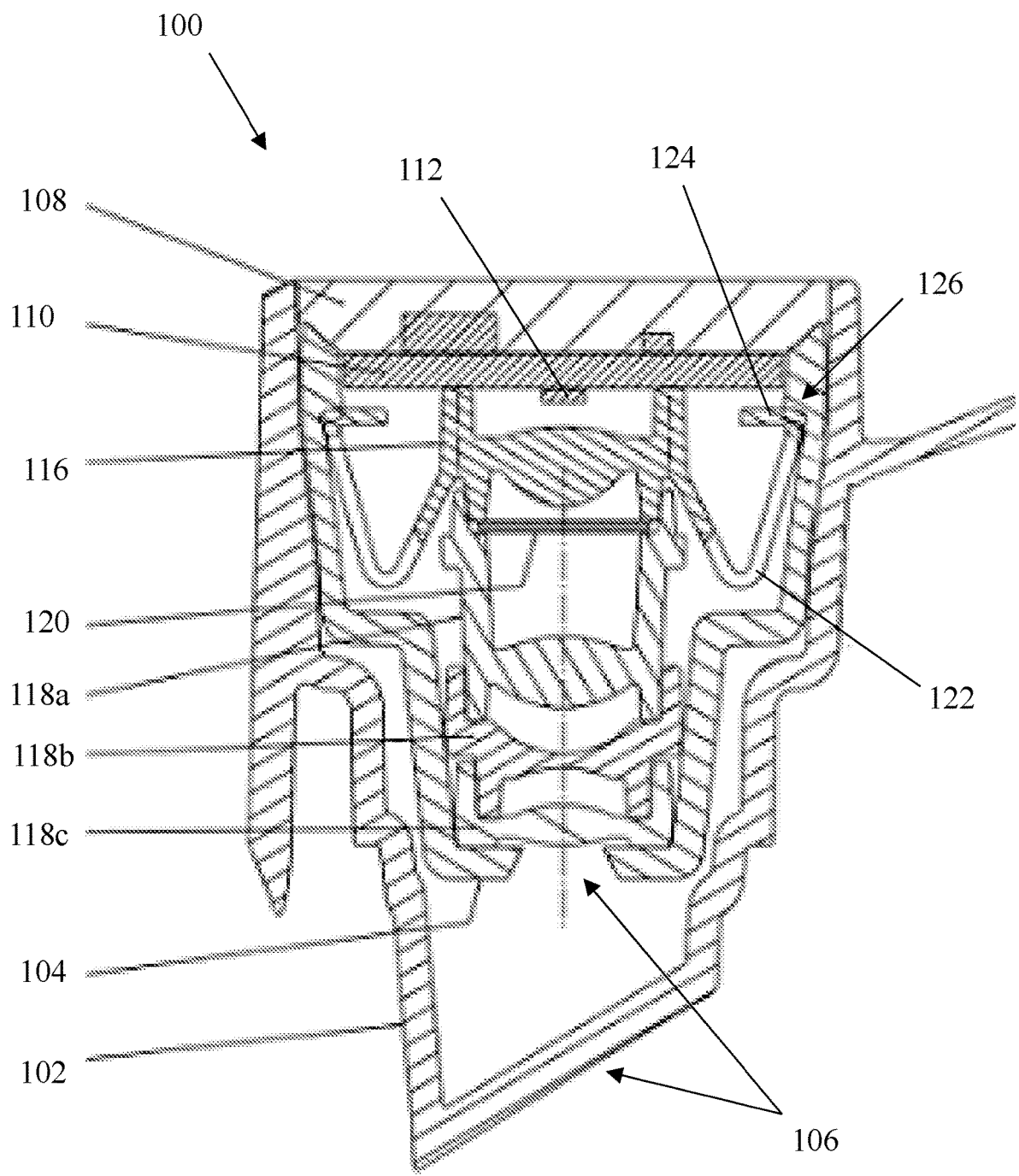

FIGS. 1a and 1b illustrate a logo lamp device 100 according to a first embodiment of the present disclosure. The logo lamp device 100 comprises an outer housing 102 and an inner housing 104. The inner housing 104 is enclosed within the outer housing 102. Both the inner housing 104 and the outer housing 102 have an open end 106. The open ends 106 of the inner housing 104 and the outer housing 102 allow light rays to exit the logo lamp device 100.

The inner housing 104 and the outer housing 102 may be molded in one piece. In another embodiment the inner housing 104 and the outer housing 102 may be molded in separate pieces and joined together by using a joining element, such as a mechanical fastener, adhesive or welding. The outer housing 102 is configured to be disposed within a rear view system (not shown) of a motor vehicle.

The outer housing 102 comprises a cylindrical portion 102a. The cylindrical portion 102a has a longitudinal axis A-A. The logo lamp device 100 is configured to be rotated around said axis A-A within a housing of the rear view system (not shown). The outer housing 102 further comprises at least one arm 102b, at least one wing 102c and at least one hole 102d. The at least one arm 102b of the outer housing 102 is configured to sit on the housing of the rear view system. The at least one wing 102c having the at least one hole 102d is configured to fix the logo lamp device 100 on the housing of the rear view system. In the illustrated embodiment, the outer housing 102 has three arms 102b, one wing 102c having one extended hole 102d.

During assembly of the logo lamp device 100 in the rear view system, the cylindrical portion 102a of the outer housing 102 is inserted into the housing of the rear view system in such a way that the at least one arm 102b of the outer housing 102 sits on the housing of the rear view system and the extended hole 102d of the outer housing 102 aligns with a hole in the housing of the rear view system. The logo lamp device 100 is then adjusted by rotating the logo lamp device 100 about the axis A-A. After rotational adjustment, the logo lamp device 100 is fastened on the rear view system by a fastener, which is inserted and fastened into the extended hole 102d of the outer housing 102 and the hole of the housing of the rear view system. Various other embodiments are possible in which the logo lamp device 100 may be mounted directly on the vehicle independent of the rear view system.

The logo lamp device 100 further comprises a printed circuit board (PCB) 110 enclosed within the inner housing 104. The PCB 110 comprises at least one light source 112 and other electronic elements for controlling the at least one light source 112.

The logo lamp device 100 further comprises an encapsulant 108 configured opposite to the open ends 106 of the inner housing 104 and the outer housing 102. The encapsulant 108 acts as a sealant for sealing the respective ends of the inner housing 104 and the outer housing 102. The encapsulant 108 may be a liquid material that is configured to be cured on the inner housing 104, the outer housing 102 and the PCB 110 to form a hardened material in response to being cured.

The logo lamp device 100 further comprises an optical assembly 114 having plurality of lenses facing the at least one light source 112. The plurality of lenses comprises at least one first lens 116 and at least one second lens 118. Various numbers of lenses are possible for each of the at least one first lens 116 and the at least one second lens 118 based on the projection requirement. In the embodiment of FIGS. 1a and 1b, the at least one first lens 116 comprises one lens and the at least one second lens 118 comprises three lenses 118a, 118b, 118c, stacked one over the other on the common axis A-A such that no tolerance is present between the at least one first lens 118 and the at least one second lens 116.

The at least one first lens 116 may be a condenser lens and the at least one second lens 118 may be a projector lens. The at least one first lens 116 may be used to condense the light rays coming from the at least one light source 112, and the at least one second lens 118 may be used to direct and project the light rays outside the logo lamp device 100.

The optical assembly 114 further comprises a mask 120 interposed between the at least one first lens 116 and the at least one second lens 118. The mask 120 may be made of an opaque material having one or more cut-outs of an image, shape, symbol, logo, icon or text such that the cut-out portion of the mask 120 allows the light to pass through and the opaque portion of the mask 120 stops the light rays to pass through the mask 120. In this manner, the projection of the image, shape, symbol, logo, icon or text is possible via the logo lamp device 100. Other embodiments of the mask 120 may include a colored sheet for projecting various colored projections through the logo lamp device 100.

Figure 2:
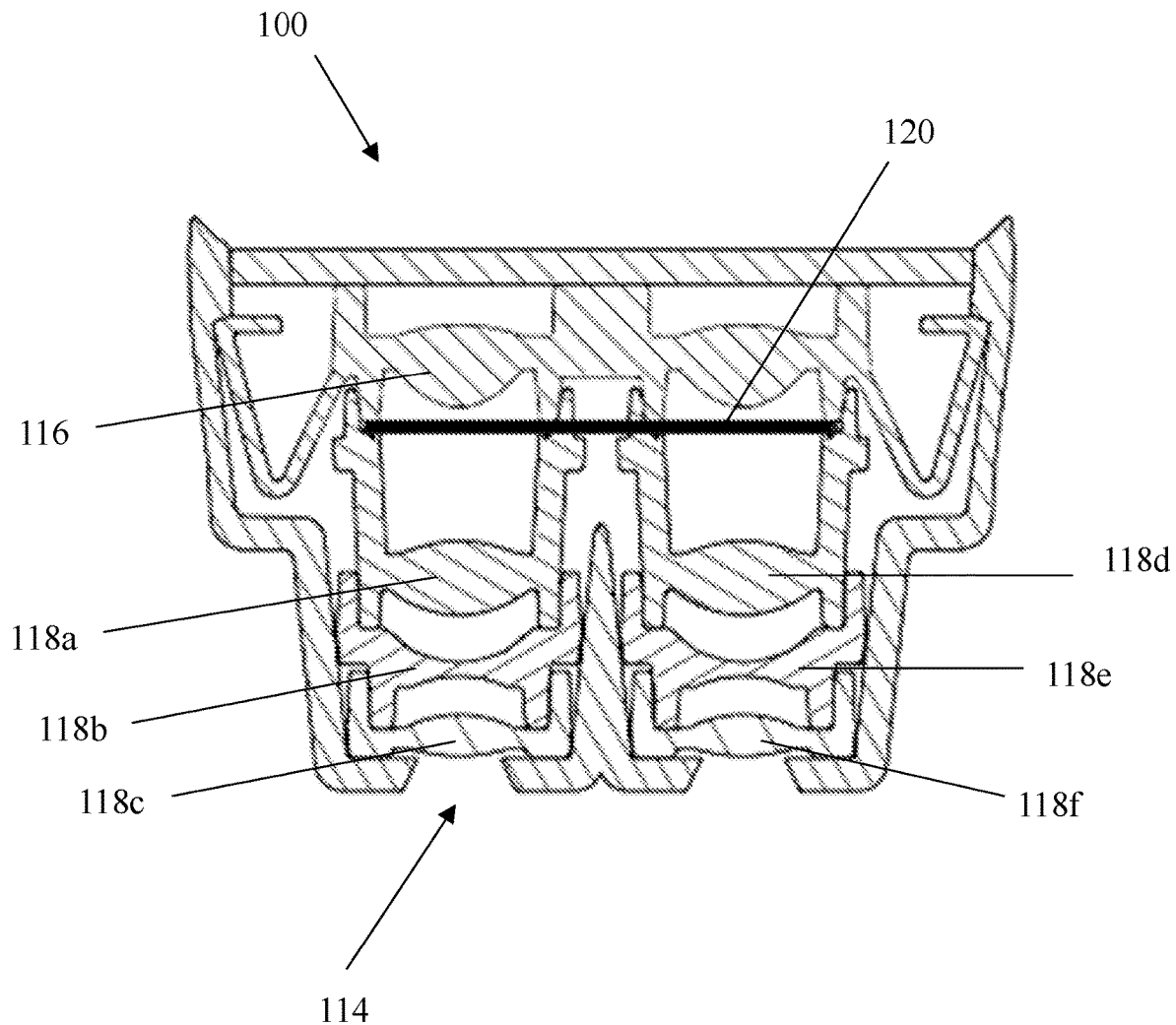
FIG. 2: illustrates a sectional view of a logo lamp device illustrating a second embodiment of the present disclosure.

FIG. 2 illustrates a second embodiment of the logo lamp device 100 with a different optical assembly 114. The optical assembly 114 of FIG. 2 still comprises a plurality of lenses with at least one first lens 116 and at least one second lens 118. While the at least one first lens 116 has one lens, the at least one second lens 118 has six lenses 118a, 118b, 118c, 118d, 118e, 118f. Three of the lenses 118a, 118b, 118c are arranged in one stack and three of the lenses 118d, 118e, 118f are arranged in another stack in a parallel combination. The optical assembly 114 further comprises one mask 120 interposed between the at least one first lens 116 and the two stacks of the at least one second lens 118.

The mask 120 may have more than one cut-outs for projecting more than one projection selected from of an image, shape, symbol logo, icon and/or text. In the illustrated embodiment, the mask 120 has two cut-outs for two simultaneous projections.

The at least one first lens 116 may be a condenser lens and the at least one second lens 118 may be a plurality of projector lenses. Thus, in this embodiment, one condenser lens, one mask and six projector lenses are illustrated. The advantage of having such an arrangement of lenses is that a common condenser lens and a common mask are sufficient to project more than one projection.

Various other possible arrangement of lenses and mask is also possible. For example, the at least one first lens 116 may have one lens, the mask may have one mask, and the at least one second lens may have two or three stacks of lenses, each stack may have four or five lenses.

The logo lamp device 100 further comprises at least one retaining mechanism for locking the optical assembly 114 on the inner housing 104. The retaining mechanism is configured between the at least one first lens 116 and the inner housing 104. The retaining mechanism retains the optical assembly 114 in the inner housing 104 in a closed-fit manner such that there is no tolerance between plurality of lenses. The retaining mechanism is also configured in a manner that a residual force is acting all the time between optical assembly 114 and the inner housing 104. Thus, the optical assembly 114 is rattle free even when the logo lamp device 100 is exposed to shock or vibration.

In the illustrated embodiment shown in FIGS. 1a and 1b, the retaining mechanism is a snap-fit mechanism. As shown, the at least one first lens 116 comprises at least one extended arm 122 having a retaining end 124 (more clearly shown in FIG. 1b). The inner housing 104 comprises a receiving portion 126 for receiving the retaining end 124 of the extended arm 122 of the at least one first lens 116. The extended arm 122 of the at least one first lens 116 is in the form of U-shape or V-shape which is configured to be deflected when assembly is initiated. When assembled, the retaining end 124 of the at least one first lens 116 sits on the receiving portion 124 of the inner housing 104, and the extended arm 122 regains its original shape, hence the at least one first lens 116 is locked on the inner housing 104. The at least one first lens 116 is supported by the PCB 110 from the top and the at least one second lens 118 on the bottom having the mask 120 interposed between the at least one first lens 116 and the at least one second lens 118. Thus, a compact assembly is obtained, and a residual force is always acting on the at least one first lens 116, the mask 120 and the at least one second lens 118 due to the configuration of the at least one first lens 116, the at least one second lens 118 and the snap fit mechanism between the at least one first lens 116 and the inner housing 104.

Figure 3:
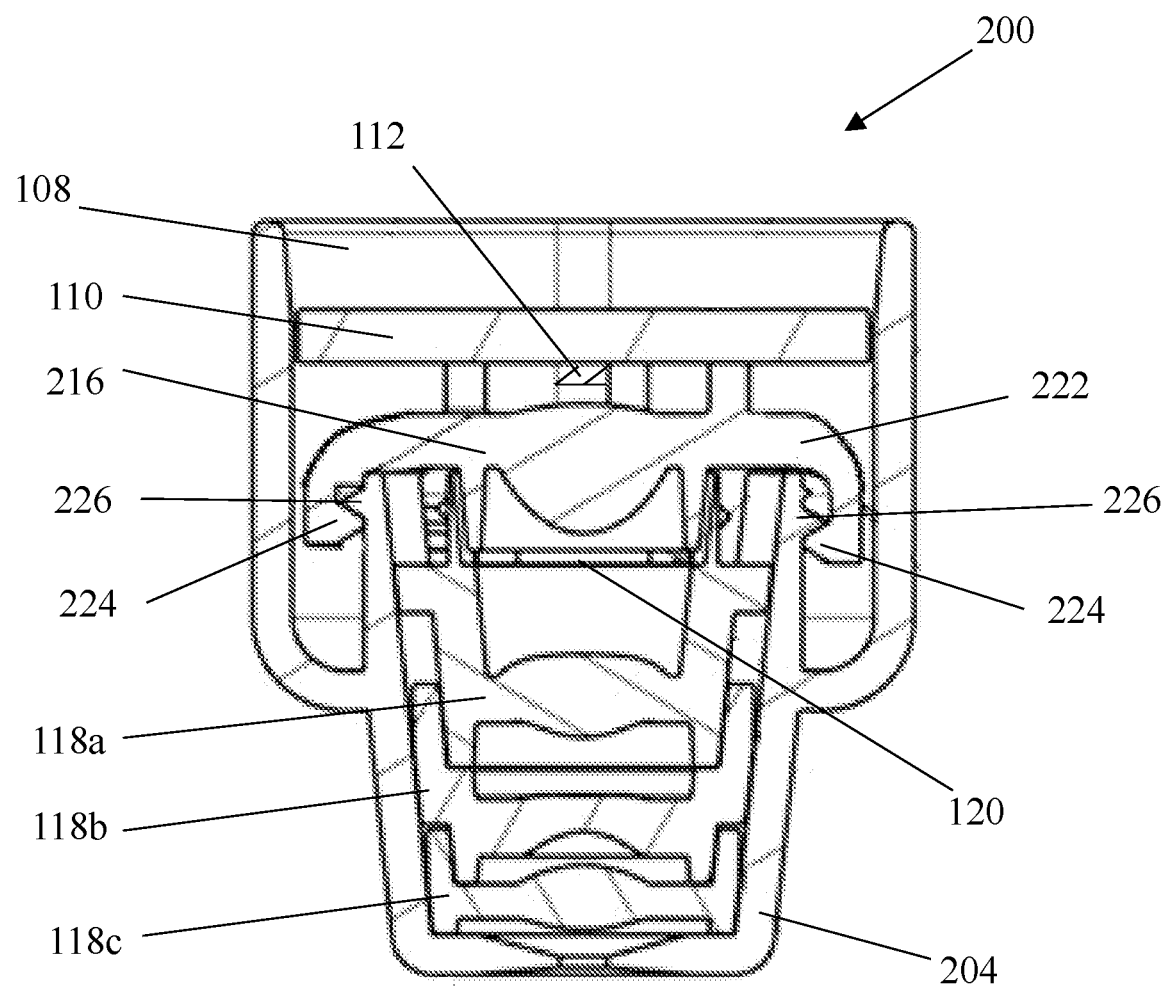
FIG. 3: a sectional view of a logo lamp device according to an embodiment of the present disclosure.

FIG. 3 shows a third embodiment of a logo lamp device 200 without showing the outer housing 102 for the sake of simplicity. This embodiment is similar to the principles of the above embodiments with at least one first lens 216, a mask 120 and a least one second lens 118, except for significant modifications in the retaining mechanism which are discussed herein. In the embodiment shown in FIG. 3, the retaining mechanism is a threaded mechanism. The at least one first lens 216 comprises for that purpose at least one extended arm 222 having threads 224. The inner housing 204 comprises threads 226 complementary to the threads 224 of the at least one first lens 216. During assembly, the threads 224 of the at least one first lens 216 mate with the threads 226 of the inner housing 204. Again, the at least one first lens 216 is supported by the PCB 110 from the top and the at least one second lens 118 on the bottom having the mask 120 interposed between the at least one first lens 216 and the at least one second lens 118. Thus, a compact assembly is obtained, and a residual force is always acting on the at least one first lens 216, the mask 120 and the at least one second lens 118 due to the configuration of the at least one first lens 216, the at least one second lens 118 and the threaded mechanism between the at least one first lens 216 and the inner housing 204.

Figure 4:
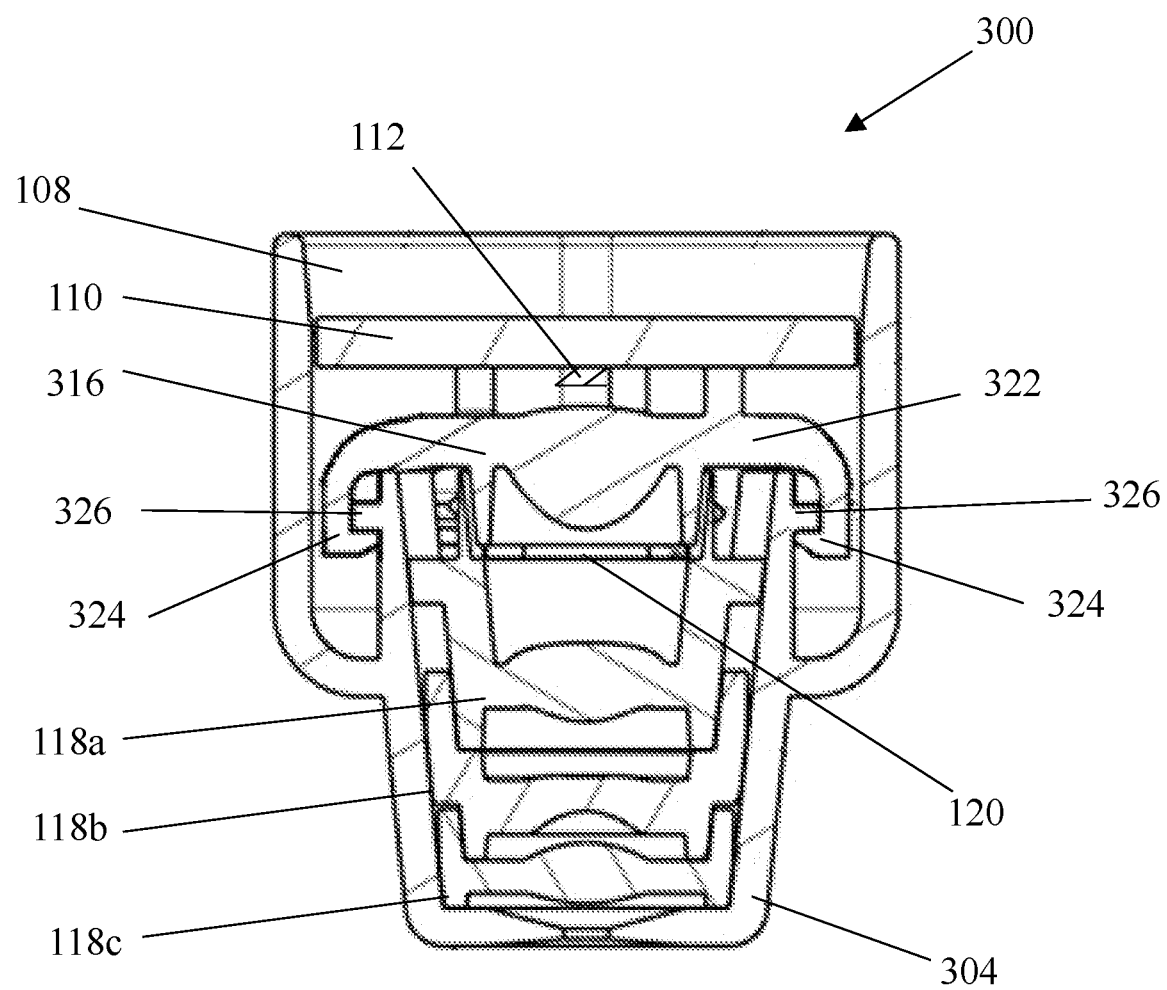
FIG. 4: a sectional view of a logo lamp device according to an embodiment of the present disclosure.

FIG. 4 shows a fourth embodiment of a logo lamp device 300 without showing the outer housing 102 for the sake of simplicity. This embodiment is similar to the principles of the above embodiments with at least one first lens 316, a mask 120 and a least one second lens 118, except for significant modifications in the retaining mechanism which are discussed herein. In the embodiment shown in FIG. 4, the retaining mechanism is a bayonet mechanism. The at least one first lens 316 comprises at least one extended arm 322 having a bayonet end 324. The inner housing 304 comprises a bayonet receiving portion 326. During assembly, the bayonet end 324 of the at least one first lens 316 mate with the bayonet receiving portion 326 of the inner housing 304. Again, the at least one first lens 316 is supported by the PCB 110 from the top and the at least one second lens 118 on the bottom having the mask 120 interposed between the at least one first lens 316 and the at least one second lens 118. Thus, a compact assembly is obtained, and a residual force is always acting on the at least one first lens 316, the mask 120 and the at least one second lens 118 due to the configuration of the at least one first lens 316, the at least one second lens 118 and the bayonet mechanism between the at least one first lens 316 and the inner housing 304.

Figure 5C:
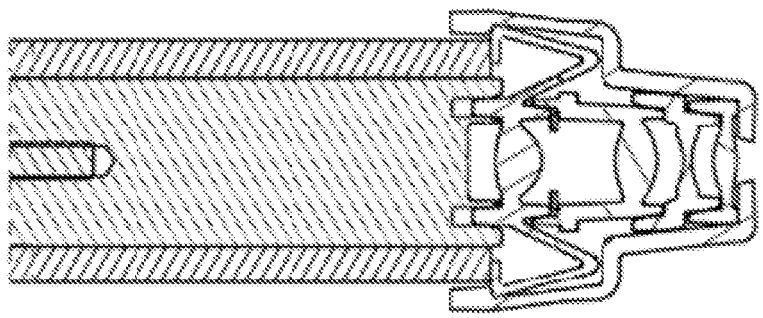
FIGS. 5a to 5c: illustrate sectional views of the logo lamp device of FIGS. 1a and 1b showing the showing the assembling steps of the at least one first lens.
Figure 5B:
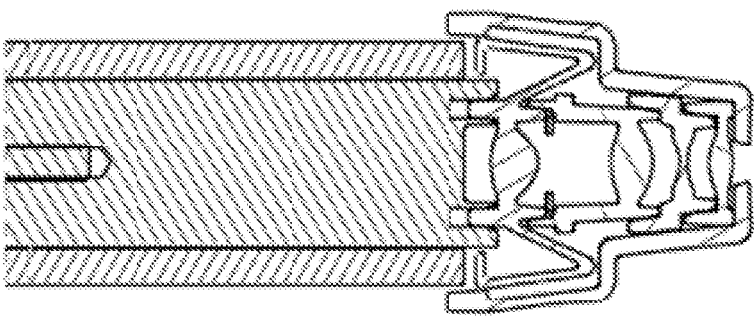
Figure 5A:
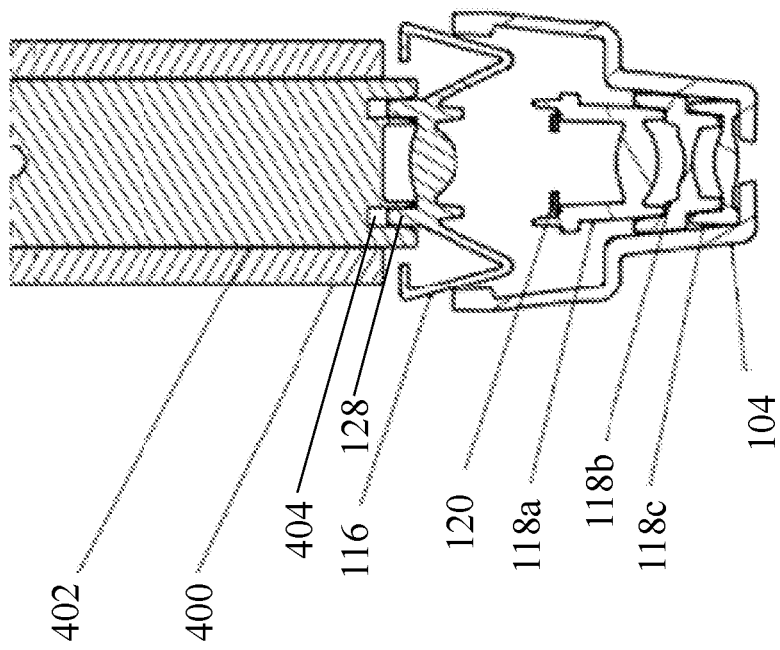

The present disclosure also provides a method of assembling the logo lamp device 100, 200, 300 according to the previous embodiments, as illustrated in FIGS. 5a to 5:

The method comprises the step of providing an inner housing 104, 204, 304, an outer housing 102 and an optical assembly 114 having a plurality of lenses and a mask 120. The inner housing 104, 204, 304 is enclosed within the outer housing 102. The plurality of lenses comprises at least one first lens 116, 216, 316 and at least one second lens 118.

The method further comprises the step of arranging the at least one second lens 118 of the optical assembly 114 within the inner housing 104, 204, 304. The at least one second lens 118 may comprise one or more lenses. In the embodiment shown in FIGS. 5a to 5c, the at least one second lens 118 comprises three lenses 118a, 118b, 118c stacked one over the other on a common axis A-A such that no tolerance is present between the at least one second lens 118.

The method further comprises the step of arranging the mask 120 on top of the at least one second lens 118. In this present embodiment, the mask 120 is arranged on top of the lens 118a.

The method further comprises the step of bringing the at least one first lens 116, 216, 316 with an assembling tool 400 in such a way that the at least one first lens 116, 216, 316 faces the mask 120 and is axially aligned with at least one second lens 118.

The method further comprises the step of fixing the at least one first lens 116, 216, 316 on the inner housing 104, 204, 304 by using the assembling tool 400 to obtain a closed-fit arrangement of the at least one first lens 116, 216, 316, the mask 120 and the at least one second lens 118. The at least one first lens 116, 216, 316, the mask 120 and the at least one second lens 118 are arranged on a common axis A-A.

The method further comprises the step of arranging a printed circuit board (PCB) 110 on top of the at least one first lens 116, 216, 316. The PCB 110 has at least one light source 112 facing the at least one first lens 116, 216, 316.

The method further comprises the step of disposing an encapsulant 108 over the PCB 110, the inner housing 104, 204, 304 and the outer housing 102 to obtain the logo lamp device 100, 200, 300.

FIGS. 5a to 5c illustrate sectional views of the logo lamp device 100 of FIGS. 1a and 1b showing the assembly of the logo lamp device 100 of FIGS. 1a and 1b, particularly the assembly of at least one first lens 116 on the inner housing 104 by using an assembling tool 400. As shown in FIG. 5a, the at least one second lens 118 having three lenses 118a, 118b, 118c and the mask 120 are arranged in the inner housing 104. FIG. 5a also shows the at least one first lens 116 being arranged on the inner housing 104 in unassembled state. The at least one first lens 116 comprises a protrusion 128 for holding a holder 402 of the assembling tool 400. The holder 402 of the assembling tool 400 comprises a constriction 404 configured to be attached to the protrusion 128 of the at least one first lens 116 during assembly. FIG. 5b illustrates an intermediate state in which the at least one first lens 116 is pushed down in the inner housing 104 by the assembling tool 400 but not snap-fitted completely. FIG. 5c illustrates an assembled state in which the at least one first lens 116 is further pushed down and snap-fitting of the at least one first lens 116 and the inner housing 104 is completed. After fitting the at least one first lens 116 on the inner housing 104, the assembling tool 400 is removed. The PCB 110 is then configured on the at least one first lens 116, and the encapsulant 108 is arranged on the PCB 110, the inner housing 104 and the outer housing 102 to obtain the fully assembled logo lamp device 100.

Figure 6:
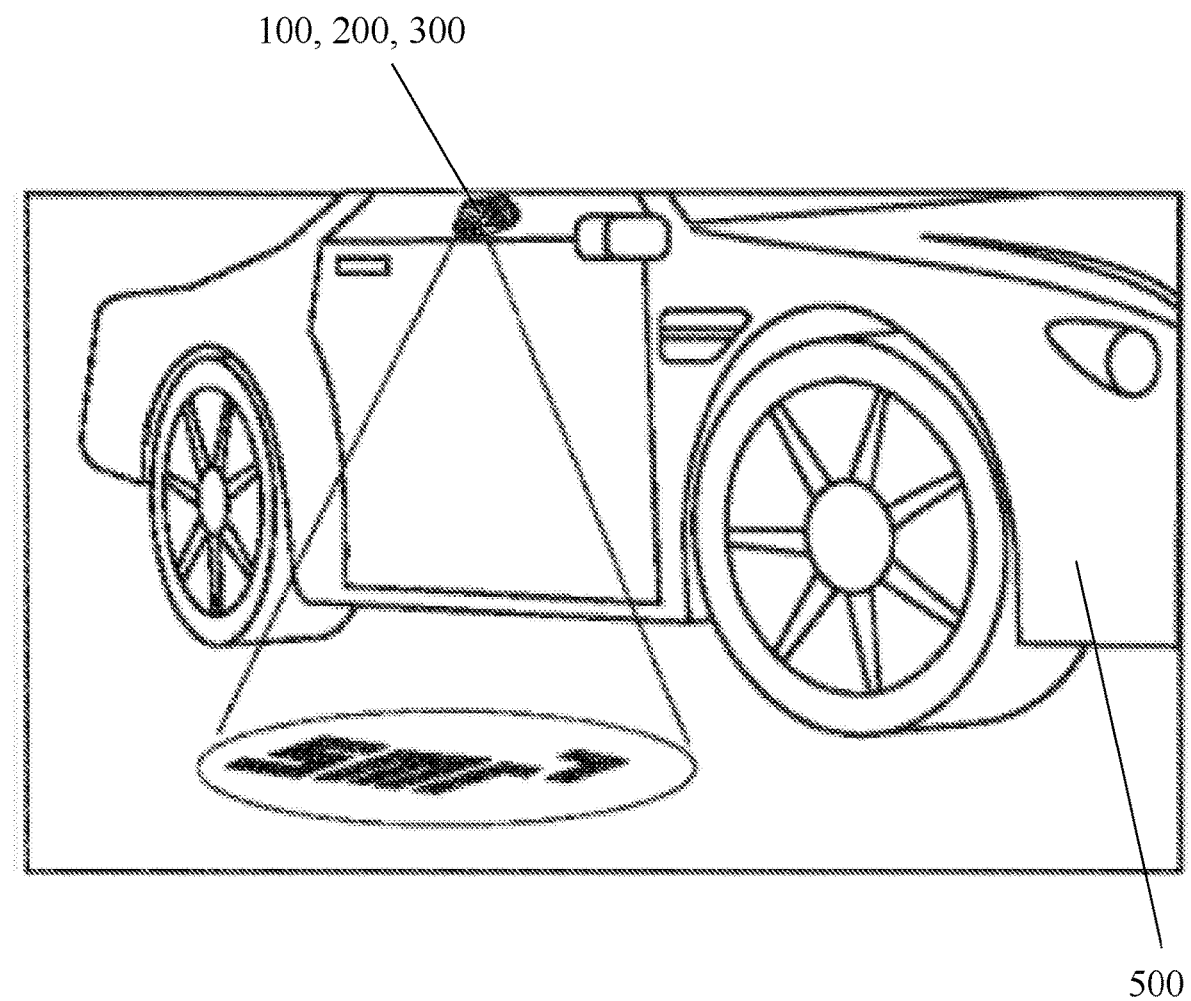
FIG. 6: is a schematic illustration of a vehicle mounted with the logo lamp device according to an embodiment of the present disclosure.

FIG. 6 shows an illustrative example of a logo projection by the logo lamp device 100, 200, 300 and the arrangement of the logo lamp device 100, 200, 300 on a vehicle 500. The logo lamp device 100, 200, 300 is mounted on a mounting location of the vehicle 500. In this embodiment, the logo lamp device 100, 200, 300 is mounted on the door of the vehicle 500. In other embodiments, one or more logo lamp device 100, 200, 300 may be mounted on the vehicle 500 at the mounting location selected from a group at the front portion, at the rear portion, on a side portion, on front bumper, on the rear bumper, on a left door and on a right door of the vehicle 500.

Although the subject matter of the present disclosure has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims. I.e. the features disclosed in the foregoing description, the claims, and the drawings may be essential, both individually and in any combination, for accomplishing the present disclosure in its various embodiments. The embodiments shown herein are only examples of the present disclosure and must therefore not be understood as being restrictive. Alternative embodiments considered by the skilled person are equally covered by the scope of protection of the present disclosure.

REFERENCE SIGNS

100: logo lamp device
102: outer housing
102a: cylindrical portion of outer housing
102b: at least one arm of outer housing
102c: at least one wing of outer housing
102d: at least one hole of outer housing
104: inner housing
106: open end
108: encapsulant
110: printed circuit board
112: at least one light source
114: optical assembly
116: at least one first lens
118, 118a-118f: at least one second lens
120: mask
122: extended arm
124: retaining end of at least one first arm
200: logo lamp device
204: inner housing
216: at least one first lens
222: extended arm
224: threads of at least one first arm
300: logo lamp device
304: inner housing
316: at least one first lens
322: extended arm
324: bayonet end of at least one first arm
126: receiving portion of inner housing
226: threads of the inner housing
326: bayonet receiving portion of inner housing
128: protrusion of at least one first lens
400: assembling tool
402: holder of the assembling tool
404: constriction of holder
500: vehicle
A-A axis It is claimed:

1. A logo lamp device for a vehicle, comprising
an inner housing and an outer housing, the inner housing and the outer housing having an open end;
an encapsulant disposed opposite to the open end of the inner housing and the outer housing;
a printed circuit board (PCB) enclosed within the inner housing;
a light source connected to the PCB and enclosed within the inner housing;

an optical assembly having plurality of lenses, wherein the plurality of lenses include a first lens and a second lens; and a retaining mechanism between the first lens and the inner housing, wherein the first lens is configured to push the second lens against the inner housing;

wherein the retaining mechanism comprises a snap fit mechanism;

wherein the first lens comprises an extended arm having a retaining end, and the inner housing comprises a receiving portion for receiving the retaining end of the extended arm of the at least one first lens; and wherein the extended arm of the first lens is configured to deflect and regain its shape during assembly for locking the first lens on the inner housing.

2. The logo lamp device of claim 1, wherein the first lens is detachably mounted onto the inner housing.

3. The logo lamp device of claim 1, wherein the first lens is a condenser lens and the second lens is a projector lens.

4. The logo lamp device of claim 1, further comprising a plurality of second lenses.

5. The logo lamp device of claim 1, wherein the optical assembly further comprises a mask interposed between the first lens and the second lens.

6. The logo lamp device of claim 5, wherein the mask is provided with a cut-out for determining a projection.

7. The logo lamp device of claim 1, wherein the inner housing and the outer housing are made in one piece.

8. The logo lamp device of claim 1, wherein the inner housing and the outer housing are made in separate pieces.

9. The logo lamp device of claim 1, wherein the outer housing has a cylindrical portion, an arm, a wing, and a hole configured for positioning and fixing the logo lamp device on a rear view system.

10. An external rear view system of a vehicle comprising at least one logo lamp device according to claim 1.

11. A vehicle comprising at least one logo lamp device according to claim 1.

12. The vehicle according to in claim 11, wherein one or more logo lamp device is mounted on the vehicle at a mounting location selected from a group consisting of: at a front portion, at a rear portion, on a side portion, on a front bumper, on a rear bumper, on a left door, and on a right door of the vehicle.

\* \* \* \* \*